US012610308B2

(12) United States Patent
Basu Mallick et al.

(10) Patent No.: US 12,610,308 B2
(45) Date of Patent: Apr. 21, 2026

(54) ACQUIRING ON-DEMAND SYSTEM INFORMATION

(71) Applicant: Lenovo (Singapore) Pte. Ltd., New Tech Park (SG)

(72) Inventors: Prateek Basu Mallick, Dreieich (DE); Ravi Kuchibhotla, Chicago, IL (US); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 356 days.

(21) Appl. No.: 18/017,634

(22) PCT Filed: Jul. 21, 2021

(86) PCT No.: PCT/IB2021/056564

§ 371 (c)(1),
(2) Date: Jan. 23, 2023

(87) PCT Pub. No.: WO2022/018643

PCT Pub. Date: Jan. 27, 2022

(65) Prior Publication Data

US 2023/0300725 A1     Sep. 21, 2023

Related U.S. Application Data

(60) Provisional application No. 63/055,639, filed on Jul. 23, 2020.

(51) Int. Cl.
H04W 48/14     (2009.01)
H04W 88/04     (2009.01)

(52) U.S. Cl.
CPC ............ H04W 48/14 (2013.01); H04W 88/04 (2013.01)

(58) Field of Classification Search
None
See application file for complete search history.

(56) References Cited

U.S. PATENT DOCUMENTS 10,412,706 B2 *    9/2019   Kalhan ................. H04W 72/04
10,609,653 B2 *    3/2020   Zhang ................. H04W 52/362
(Continued)

FOREIGN PATENT DOCUMENTS

WO          2019084714 A1      5/2019
WO      WO-2021134162 A1 *     7/2021

OTHER PUBLICATIONS

PCT/IB2021/056564, "Notification of Transmittal of the International Search Report and the Written Opinion of the International Searching Authority, or the Declaration", International Searching Authority, Oct. 28, 2021, pp. 1-15.
(Continued)

*Primary Examiner* — Hong S Cho
(74) *Attorney, Agent, or Firm* — Kunzler Needham & Hilton

(57)     ABSTRACT

Apparatuses, methods, and systems are disclosed for acquiring on-demand system information. One apparatus of a first user equipment ("UE") device includes a transceiver that receives a system information block ("SIB") from a second UE device and a processor that determines, based on the received SIB, at least one on-demand SIB from the mobile wireless communication network, wherein the transceiver sends a request for the at least one on-demand SIB to the second UE device.

20 Claims, 10 Drawing Sheets

(56)　　　　　　References Cited

U.S. PATENT DOCUMENTS

| | | | | |
|---|---|---|---|---|
| 2018/0092027 | A1 * | 3/2018 | Sheng | H04W 48/08 |
| 2020/0187097 | A1 * | 6/2020 | Quan | H04W 48/14 |
| 2022/0338283 | A1 * | 10/2022 | Wang | H04W 76/14 |

OTHER PUBLICATIONS

LG, "Report of email discussion [97bis#18][LTE/FeD2D]—System Information", 3GPP TSG RAN WG2#98 R2-1705767, May 15-19, 2017, pp. 1-14.

SA2, "Reply LS on mapping restriction for LCP procedure", 3GPP TSG RAN WG2#107 R2-1908662, Aug. 26-30, 2019, pp. 1-2.

OPPO, "New SID: Study on NR sidelink relay", 3GPP TSG RAN Meeting #86 RP-193253, Dec. 9-12, 2019, pp. 1-5.

3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 V15.1.1, Apr. 2018, pp. 1-55.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.2.0, Mar. 2020, pp. 1-53.

LG Electronics Inc., "SI message delivery for remote UE", 3GPP TSG-RAN WG2 Meeting #97bis R2-1703026, Apr. 3-7, 2017, pp. 1-2.

* cited by examiner

700

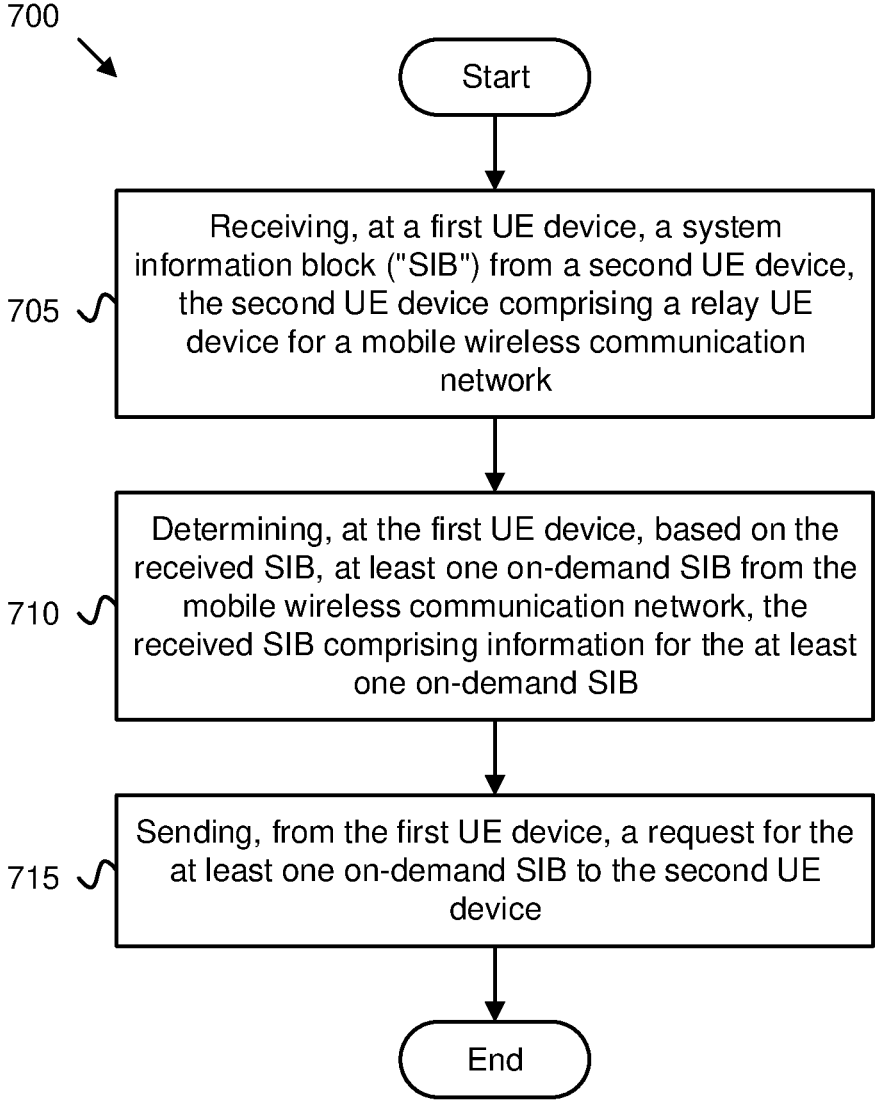

Start

Receiving, at a first UE device, a system information block ("SIB") from a second UE device, the second UE device comprising a relay UE device for a mobile wireless communication network

705

Determining, at the first UE device, based on the received SIB, at least one on-demand SIB from the mobile wireless communication network, the received SIB comprising information for the at least one on-demand SIB

710

Sending, from the first UE device, a request for the at least one on-demand SIB to the second UE device

715

End

FIG. 7

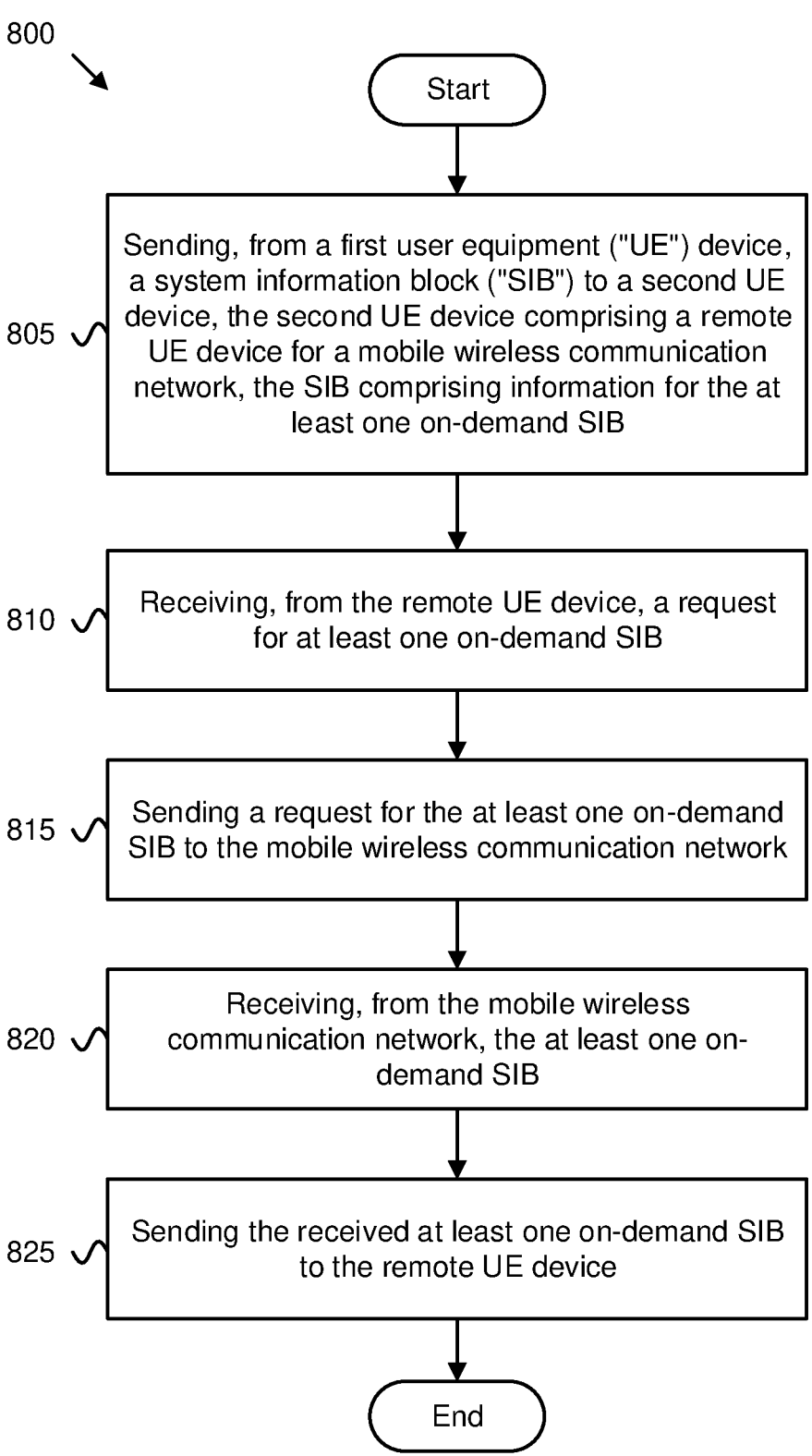

800

Start

805
Sending, from a first user equipment ("UE") device, a system information block ("SIB") to a second UE device, the second UE device comprising a remote UE device for a mobile wireless communication network, the SIB comprising information for the at least one on-demand SIB 810
Receiving, from the remote UE device, a request for at least one on-demand SIB 815
Sending a request for the at least one on-demand SIB to the mobile wireless communication network 820
Receiving, from the mobile wireless communication network, the at least one on-demand SIB 825
Sending the received at least one on-demand SIB to the remote UE device End

FIG. 8

ACQUIRING ON-DEMAND SYSTEM INFORMATION

CROSS-REFERENCE TO RELATED APPLICATIONS

This application claims priority to U.S. Provisional Patent Application No. 63/055,639 entitled "ACQUIRING ON-DEMAND SI BY A REMOTE UE" and filed on Jul. 23, 2020, for Prateek Basu Mallick, et al., which is incorporated herein by reference.

FIELD

The subject matter disclosed herein relates generally to wireless communications and more particularly relates to acquiring on-demand system information.

BACKGROUND

In certain wireless communication systems, a User Equipment device ("UE") is able to connect with a fifth-generation ("5G") core network (i.e., "5GC") in a Public Land Mobile Network ("PLMN") In wireless networks, UE devices may be connected to one another via a sidelink connection.

BRIEF SUMMARY

Disclosed are procedures for acquiring on-demand system information. Said procedures may be implemented by apparatus, systems, methods, and/or computer program products.

In one embodiment, a method includes receiving, at a first UE device, a system information block ("SIB") from a second UE device, the second UE device comprising a relay UE device for a mobile wireless communication network. In further embodiments, the method includes determining, at the first UE device, based on the received SIB, at least one on-demand SIB from the mobile wireless communication network, the received SIB comprising information for the at least one on-demand SIB. In certain embodiments, the method includes sending, from the first UE device, a request for the at least one on-demand SIB to the second UE device.

In one embodiment, a method includes sending, from a first user equipment ("UE") device, a system information block ("SIB") to a second UE device, the second UE device comprising a remote UE device for a mobile wireless communication network, the SIB comprising information for the at least one on-demand SIB. In one embodiment, the method includes receiving, from the remote UE device, a request for at least one on-demand SIB. In various embodiments, the method includes sending a request for the at least one on-demand SIB to the mobile wireless communication network. In various embodiments, the method includes receiving, from the mobile wireless communication network, the at least one on-demand SIB. In certain embodiments, the method includes sending the received at least one on-demand SIB to the remote UE device.

In one embodiment, a method includes receiving, at a mobile wireless communication network from a first user equipment ("UE") device, a request for an on-demand system information block ("SIB") for a second UE device, the first UE device comprising a relay UE device and the second UE device comprising a remote UE device, and broadcasting the on-demand SIB to the first UE device for a predetermined period of time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flowchart diagram illustrating one embodiment of a method for acquiring on-demand system information;

FIG. 8 is a flowchart diagram illustrating one embodiment of a method for acquiring on-demand system information.

DETAILED DESCRIPTION

Figure 1:
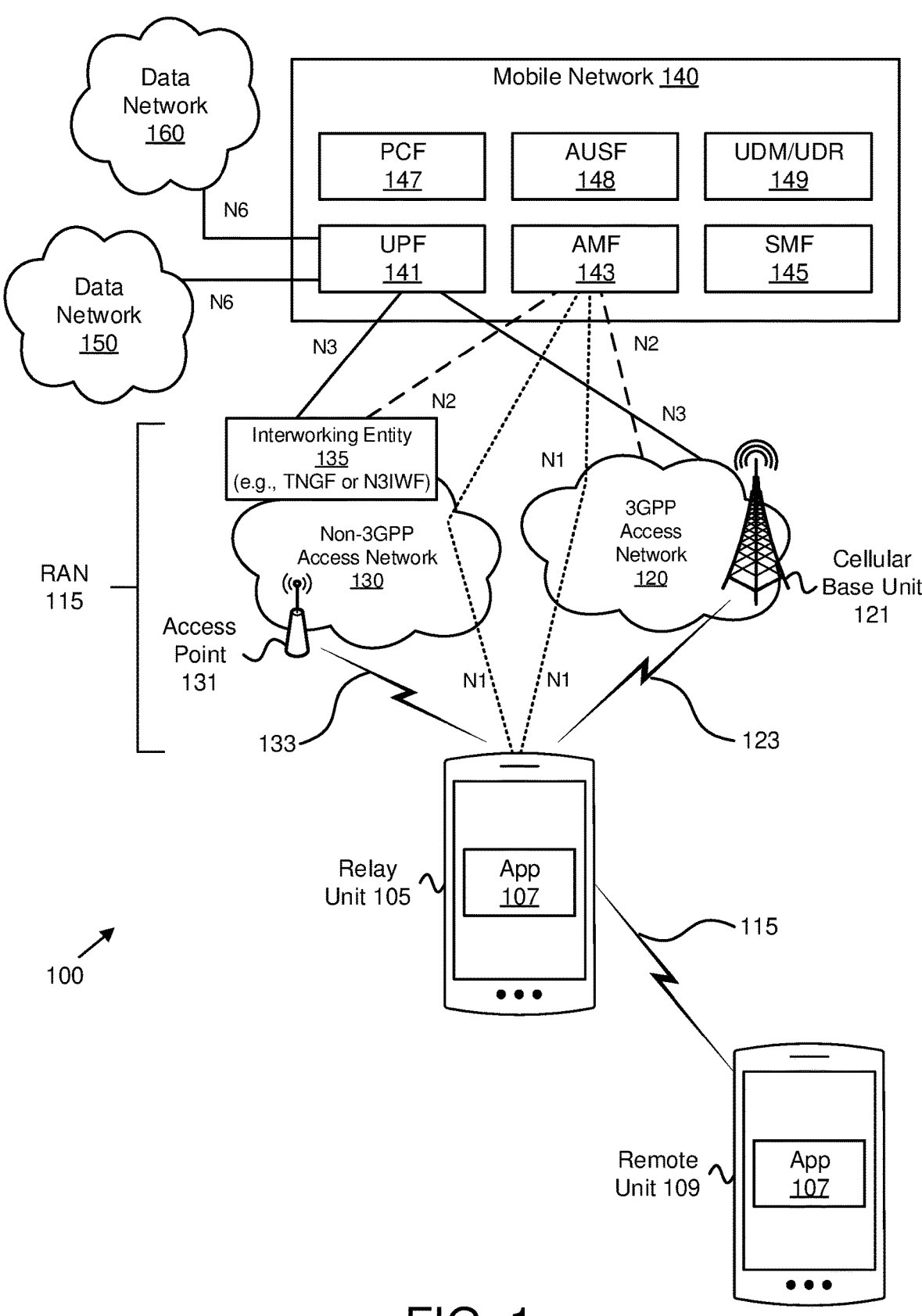
FIG. 1 is a schematic block diagram illustrating one embodiment of a wireless communication system for acquiring on-demand system information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for acquiring on-demand system information. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

More particularly, the subject matter disclosed herein relates to acquiring on-demand system information from a remote UE via new radio ("NR") sidelink relay provided by a relay UE. Examples of relays may include:

UE-to-network coverage extension: Uu coverage reachability may be necessary for UEs to reach a server in packet data network ("PDN") or counterpart UE out of a proximity area. However, some solutions on UE-to-network relay are limited to Evolved Universal Mobile Telecommunications System (UMTS) Terrestrial Radio Access ("EUTRA")-based technology, and thus cannot be applied to NR-based system, for both NG-RAN and NR-based sidelink communication.

UE-to-UE coverage extension: Proximity reachability may be limited to a single-hop sidelink connection, either via EUTRA-based or NR-based sidelink technology. However, that may not be sufficient in the scenario where there is no Uu coverage, considering the limited single-hop sidelink coverage.

Moreover, a NR sidelink relay would be responsible to provide the remote UE with required system information ("SI"), e.g., as was the case for long term evolution ("LTE").

The subject matter disclosed herein provides solutions for a remote UE, e.g., a UE that is out of coverage and/or are not being served by a corresponding in-coverage serving cell, to acquire on-demand SI via a sidelink to a relay UE.

FIG. 1 depicts a wireless communication system 100 for acquiring on-demand system information, according to embodiments of the disclosure. In one embodiment, the wireless communication system 100 includes at least one relay unit 105, a remote unit 109, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The relay unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the relay units 105 and/or remote units 109 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the relay units 105 and/or remote units 109 include wearable devices, such as smart watches, fitness bands, optical head-mounted displays, or the like. Moreover, the relay units 105 and/or remote units 109 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the relay units 105 and/or remote units 109 include a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the relay units 105 and/or remote units 109 may include a terminal equipment ("TE") and/or be embedded in an appliance or device (e.g., a computing device, as described above).

In one embodiment, the relay units 105 and/or remote units 109 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the relay units 105 and/or remote units 109 include wearable devices, such as smart watches, fitness bands, optical head-mounted displays, or the like. Moreover, the relay units 105 and/or remote units 109 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The relay units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the relay units 105 may communicate with one or more access points 131 in the non-3GPP access network(s) 130 via UL and DL communication signals carried over the non-3GPP communication links 133. Here, the access networks 120 and 130 are intermediate networks that provide the relay units 105 with access to the mobile core network 140.

In some embodiments, the relay units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a relay unit 105 may trigger the relay unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the relay unit 105 and the remote host using the PDU session. The PDU session represents a logical connection between the relay unit 105 and a User Plane Function ("UPF") 141.

In order to establish the PDU session (or PDN connection), the relay unit 105 must be registered with the mobile core network 140 (also referred to as "attached to the mobile core network" in the context of a Fourth Generation ("4G") system). Note that the relay unit 105 may establish one or more PDU sessions (or other data connections) with the mobile core network 140. As such, the relay unit 105 may have at least one PDU session for communicating with the packet data network 150. Additionally—or alternatively—the relay unit 105 may have at least one PDU session for communicating with the packet data network 160. The relay unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the relay unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the relay unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the relay unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the relay unit 105 uses the first data connection to register with the second mobile core network 140.

In one embodiment, the remote unit 109 may be connected to the relay unit 105, and the RAN 115, via a sidelink 115. As used herein, a sidelink 115 between the relay unit 105 and the remote unit 109 allows the units to communicate with one another without relaying their data via the mobile network 140. Thus, the remote unit 109 may access information from the mobile network 140 via a sidelink connection 115 with the relay unit 105 even if the remote unit 109 is not in-coverage of the RAN 115 or in a serving cell that is in-coverage.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the relay unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a relay unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A relay unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the relay unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a relay unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

To solve the problem of providing on-demand system information to a remote UE 109, e.g., out-of-coverage UE, described above, the present disclosure proposes solutions that utilize a sidelink connection 115 between the remote UE 109 and a relay UE 105 that is in-coverage and being served by a corresponding serving cell that is providing on-demand SI.

Beneficially, the solutions described herein allow a remote UE 109, that is not being served by a serving cell that is providing on-demand SI, to request and receive on-demand SI from the mobile network 140 even though the remote UE 109 is outside the coverage of the RAN 115.

As described above, a NR sidelink relay may be responsible to provide the remote UE 109 with required system information (SI), e.g., as was the case for LTE. For LTE, the 3GPP TR 36.746 describes system information reception for an evolved ProSe Remote UE where the evolved ProSe UE-to-Network Relay UE supports relaying of system information for the linked evolved ProSe Remote UEs located in-coverage of E-UTRAN coverage as well as out of E-UTRAN coverage.

Regarding system information reception for evolved ProSe Remote UE, the evolved ProSe UE-to-Network Relay UE supports relaying of system information for the linked evolved ProSe Remote UEs located in-coverage of E-UTRAN coverage as well as out of E-UTRAN coverage. The eNB can configure the evolved ProSe UE-to-Network Relay UE whether it can forward the system information to linked in-coverage evolved ProSe Remote UEs. Alternatively, the evolved ProSe UE-to-Network Relay UE is expected to forward the system information to the in-coverage evolved ProSe Remote UE. The linked evolved ProSe Remote UE utilizes the system information of the serving cell of the evolved ProSe UE-to-Network Relay UE.

Not all system information is relayed to the linked evolved ProSe Remote UE via the evolved ProSe UE-to-Network Relay UE. Essential system information blocks ("SIBs") are required to be relayed from the evolved ProSe UE-to-Network Relay UE to all linked evolved ProSe Remote UEs commonly. At least the following SIBs can be considered as essential SIBs: MIB (SFN, bandwidth), SIB1 (PLMN, cell information), SIB2 (Access Barring information), and FeD2D SIB related info (e.g., SIB18/19 or new SIBs). Evolved ProSe UE-to-Network Relay UE can optionally forward other SIBs (e.g., SIB10/11/12/13/14/15) depending on the linked evolved ProSe Remote UEs.

The evolved ProSe UE-to-Network Relay UE is expected to purely forward the SIBs without changing the information and format of the SIB. Alternatively, the evolved ProSe UE-to-Network Relay UE can only forward a subset of information of the SIB to the evolved ProSe Remote UE. An evolved ProSe UE-to-Network Relay UE may forward SIBs over sidelink using broadcast/multi-cast. The system information is not delivered periodically to the evolved ProSe Remote UE, but only when deemed necessary. The evolved ProSe UE-to-Network Relay UE can determine that SIB delivery is deemed necessary for the evolved ProSe Remote UE when system information is updated.

NR has a new a concept of on-demand SI acquisition that was not present in E-UTRA (e.g., LTE) system. The SI (e.g., SIBs) provided on demand needs to be individually requested by a UE. The network (e.g., gNB) then provides such SIB(s) upon receiving on-demand SI request. Since a remote UE 109 may be located outside of the cell coverage, it may not be able to request the on-demand SI from the gNB directly.

As another problem, the sidelink ("V2X") communications between a pair of UEs may be done on the basis of L2 IDs—a UE has one or more Source Layer-2 IDs and it transmits to one or more Destination Layer-2 IDs. The problem is that since there's no means to identify if multiple destinations IDs belong to the same physical UE, there are many PC5 radio resource control ("RRC") connections, radio link failuer ("RLF")/radio link monitoring ("RLM") procedures, channel state information ("CSI") reporting running between the same pair of physical UEs.

The problem related to on-demand SI is new for NR relays. The E-UTRA system does not have any mechanism for delivering SI on-demand and therefore no solutions exist. The solutions from NR Uu cannot be directly applied because the mechanism for on-demand SI provisioning is designed for UEs that are in-coverage and being served by a corresponding cell providing on-demand SI.

Existing solutions for the second problem fall short because they are UE based solutions and therefore harder to achieve given the lack of any central entity coordinating the sidelink UEs.

In one embodiment, system information reception for evolved ProSe Remote UE in the evolved ProSe UE-to-Network Relay UE supports relaying of system information for the linked evolved ProSe Remote UEs located in-coverage of E-UTRAN coverage as well as out of E-U IRAN coverage. In NR, a new concept of on demand system information is used whereby the network may not need to keep transmitting every SIB on a regular basis e.g., certain SIB(s) may be provided on an on-demand basis. A UE requests the network to provide the on-demand SIB(s), after which the network can start to provide the required SIB using broadcast for a limited time.

Figure 2:
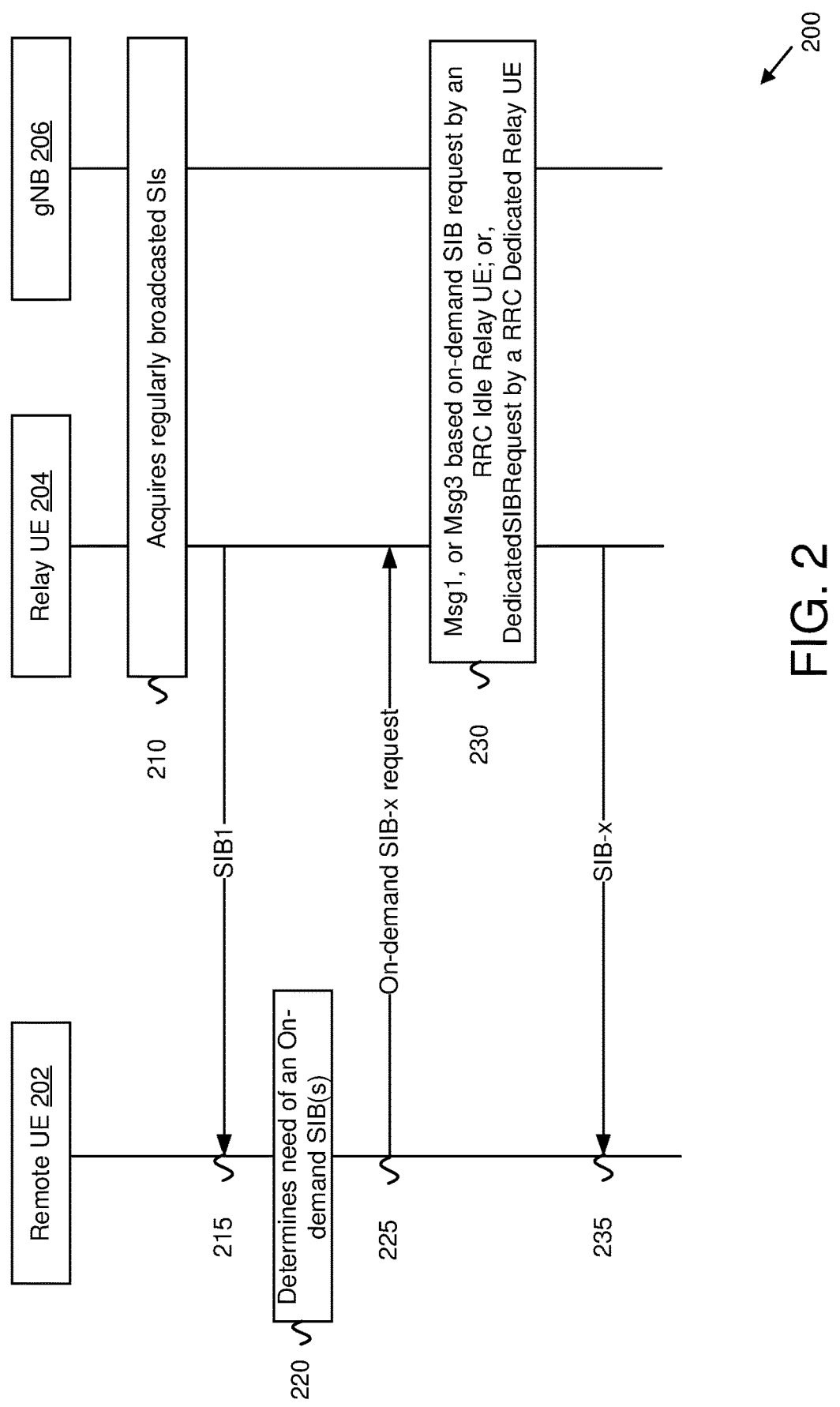
FIG. 2 is a procedure flow diagram illustrating one embodiment of on-demand system information acquisition by a remote UE.

As shown in FIG. 2, in such an embodiment, a relay UE 204 receives (see block 210) regularly requested broadcasted SIs from the gNB 206. A remote UE 202, after receiving the SIB (see messaging 215), e.g., SIB1, of a certain cell (e.g., the serving cell of the relay UE 204) checks (see block 220) if any of the SIB(s) provided on-demand from the gNB 206 are of interest to it. If so, the remote UE 202 sends (see messaging 225) a request to the relay UE 204 to acquire those SIB(s), e.g., SIB10/11/12/13/14/X, and forward them to the remote UE 202.

A relay UE 204 upon receiving the request (see messaging 225) from remote UE 202 can initiate acquisition of the said SIB(s) using an on-demand SIB acquisition procedure (see block 230). The on-demand SIB acquisition may be perform using RRC messages by an RRC Idle UE or also by an RRC Connected state UE. The particular UE first determines which SIBs are of interest to it that are provided on an on-demand basis (e.g., not regularly broadcasted) and then requests those SIBs from the network. The relay UE 204 then sends (see messaging 235) the requested on-demand SIB to the remote UE 202 that made the request.

In certain embodiments, the relay UE 204 may combine SIB requests from more than one remote UE 202 and initiate the on-demand SI acquisition together for these UEs. This may avoid multiple SIB requests on the Uu and also the forwarding of acquired SIB(s) on sidelink interface can be optimized by e.g., transmitting the SIB(s) to a group destination ID. In such an embodiment, all remote UEs 202 are included in the group destination ID, e.g., these special group destination IDs may be used for L1 or L2 filtering, and the received transport block is forwarded to RRC. The group of remote UEs that receive SI may be created by the relay UE 204 or may be predefined or preconfigured, e.g., by specification. Using the group destination ID, the relay UE 204 may serve on-demand SI for multiple remote UEs 202 in a combined manner.

In one embodiment, the procedure flow in FIG. 2 assumes that the remote UE 202 is configured to receive on-demand SIB irrespective of the serving cell of the relaying UE 204. In another embodiment, a remote UE 202 intends to receive SIBs (including on-demand SIBs) from a certain cell only (e.g., enhanced cell ID ("ECID")-X). The particular cell could be the serving cell of an in-coverage remote UE 202. To achieve this, the remote UE 202 may use a "Cell ID announcement procedure," e.g., as defined in 3GPP TS 36.746, to first select a relay UE 204 that is being served by the serving cell with ECID-X. Then, the remote UE 202 may use the procedure solution describe above and illustrated in FIG. 2 to receive on-demand SIBs as well as to receive other SIBs being relayed by the selected relay UE 204.

In certain embodiments, the remote UE 202 comprises an in-coverage UE device that is configured to request the at least one on-demand SIB from the relay UE 204 in response to a predefined condition. The predefined condition may include a remaining battery life (e.g., to conserve battery life, the remote UE 202 may request the on-demand SIB from the relay UE 204 instead of requesting it directly), the remote UE 202 may be an edge computing device, the remote UE 202 may have an unstable connection to the network, the remote UE 202 may be a remote device that selects a relay in accordance with radio criteria configured by the radio network (and its upper layers), and/or the like.

In further embodiments, an RRC connected sidelink UE that has no (or minimal) Uu data activity may not monitor a common search space (e.g., using SI-radio network temporary identifier ("RNTI")). Such a UE may have no Uu data radio bearers ("DRBs") configured and may only be using one or more sidelink radio bearers ("SLRBs") to perform sidelink transmission using NR Mode 1 grants. Any required system information may be provided dedicatedly to such a UE. The UE may update the gNB on required system information using a UEAssistanceInformation ("UAI") parameter. Alternatively, the gNB itself may provide the sidelink related SIBs to such a UE, including any update of such SIB(s).

In one embodiment, the proposed solution aggregates multiple logical channels (e.g., L2-ID pairs) belonging to a physical UE pair for RLM/RLF related procedures. Aggregation of multiple logical channels belonging to the Physical UE pair provides an AS level identifier between the UE pair. A UE, called a source UE(S), may have transmissions with a number of other Physical Target UEs, UE(T), as shown in FIG. 3.

Figure 3A:
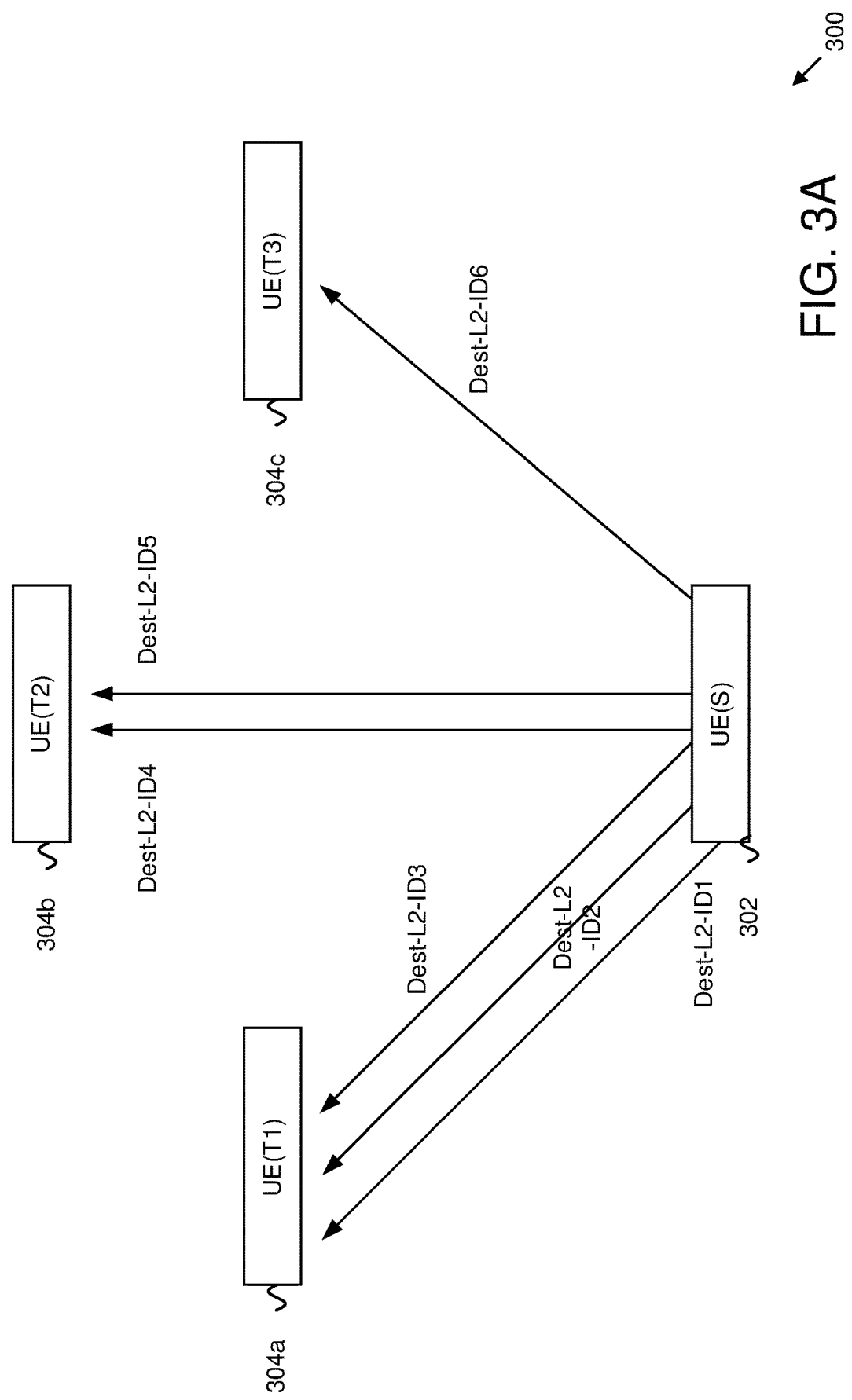
FIG. 3A illustrates the relationship between layer-2 identifiers and corresponding physical UEs.

The roles of a source and target UEs may be interchangeable and are just defined here with reference to a particular transmission. The target UE might also want to respond back to the source UE. In such an embodiment, the roles and names are reversed (UE(S) acts as UE(T) and vice-versa). FIG. 3A shows the physical UE situation—which L2 ID pair (e.g., source L2 ID and destination L2 ID) end up in the same physical UE. As used herein, "Physical UE" may refer to one particular V2X device hardware that may have multiple V2X applications running with their corresponding PC5 link identifier and L2 source identifier.

In certain embodiments, each UE of the PC5 unicast link self-assigns its source Layer 2 ID for the PC5 unicast link. The initial signaling for the establishment of the PC5 unicast link may use a default destination Layer-2 ID associated with the service type (e.g., PSID/ITS-AID) configured for PC5 unicast link establishment. The destination Layer 2 ID destined for SL unicast is obtained from the peer UE during the PC5 unicast link establishment procedure. The source Layer 2 ID of the peer UE may be used as the destination Layer 2 ID for signaling and data traffic for the PC5 unicast link. The PC5 unicast link Layer-2 IDs may change during the life of the PC5 unicast link.

Figure 3B:
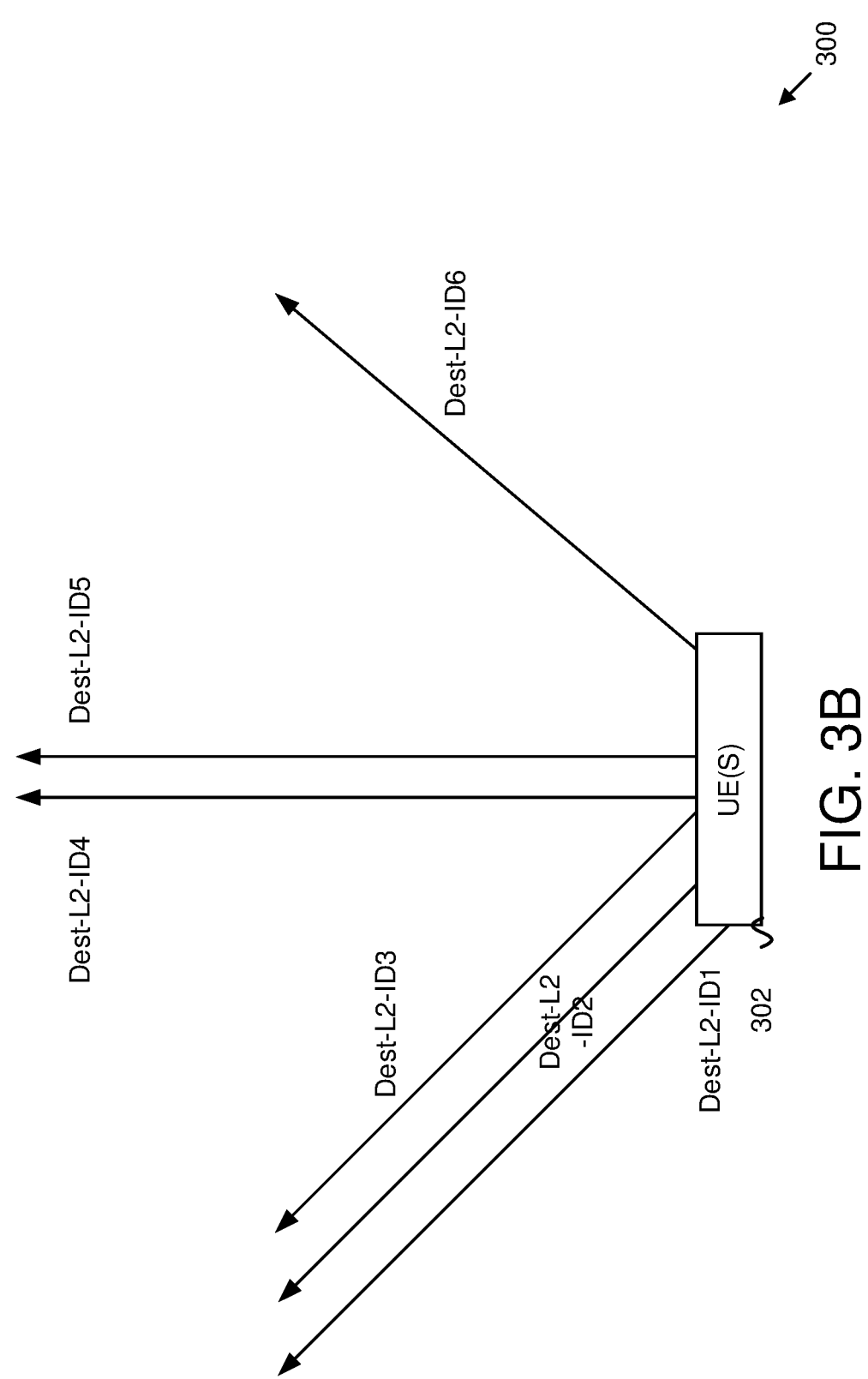
FIG. 3B is a continuation of FIG. 3A.

As shown in FIG. 3A, any pair of the peer UEs 302, 304*a-c* (e.g., UE(S) 302 and UE(T1) 304*a*) may be aware that they share multiple L2-IDs between them. This allows them to run only one procedure on a per-UE basis. In 3GPP release 16 this may not be possible because the UEs are aware only of the L2 IDs, as shown in FIG. 3B. Therefore, it is possible that UE(S) 302 and UE(T1) 304*a* are indeed running multiple radio link monitoring ("RLM") procedures between them, which may be excessive because the physical layer may experience the same channel condition notwithstanding the upper application layer. It may therefore be beneficial to streamline running only a single RLM procedure across the physical UEs. The same benefit of streamlining can be realized for CSI reporting e.g., only one CSI report, irrespective of the L2 IDs, is enough. The same may be true for other procedures such as a PC5 RRC connection. If the involved UEs realize only one PC5 RRC connection together for all L2 IDs (PC5 link) between them, then multiple context maintenance, capability signaling, and/or the like, may not be necessary.

Figure 4:
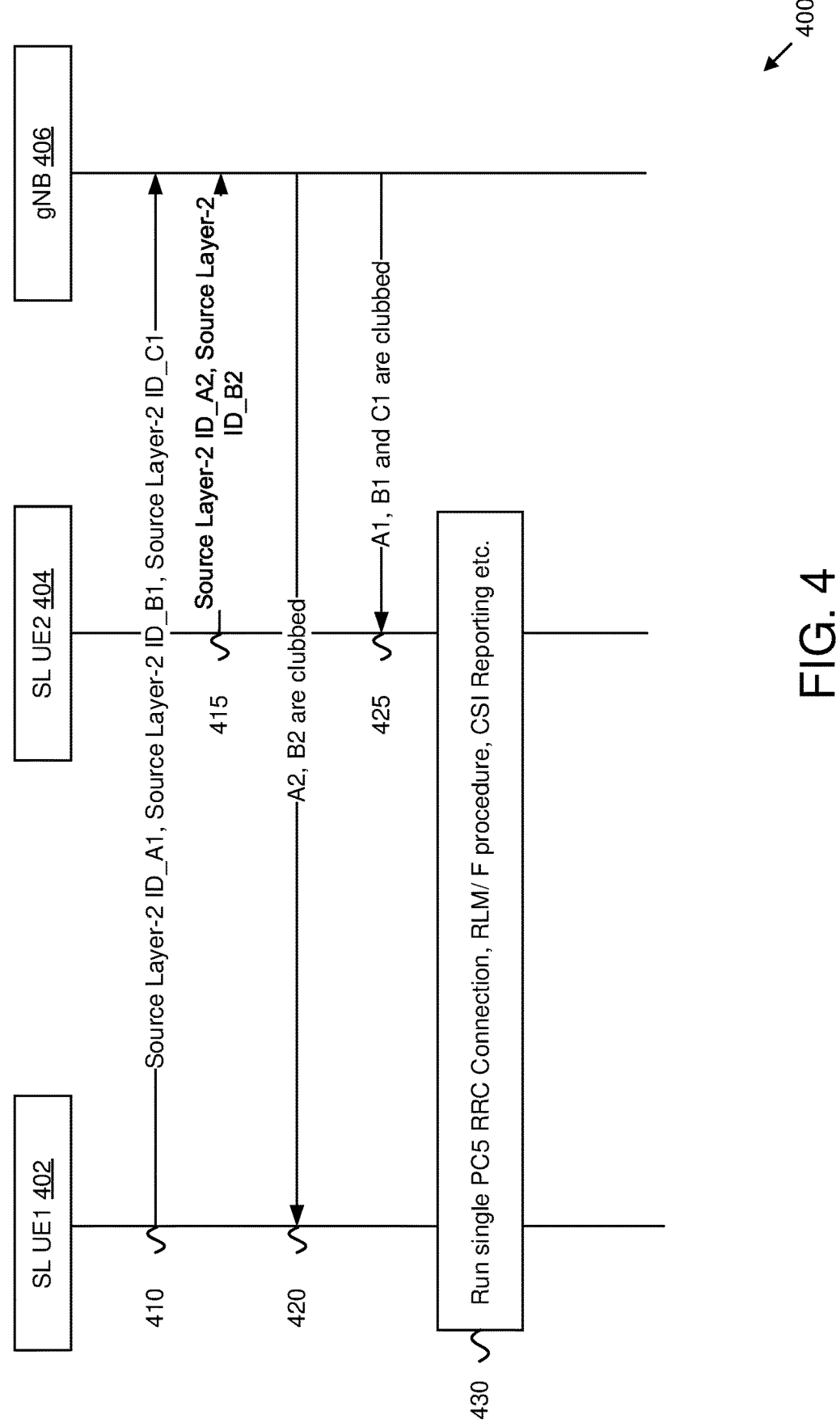
FIG. 4 is a procedure flow diagram illustrating an embodiment of clubbing layer-2 identifiers.

Such an embodiment reveals methods to streamline various access stratum procedures, mentioned previously, whereby only a single instance of the corresponding procedure is run between a pair of sidelink peer UEs. In this embodiment, as shown in FIG. 4, SL UEs 402, 404 in a cell inform (see messaging 410) a gNB 406 about their Source Layer-2 IDs (or a significant part of it such as the sixteen most significant bits). A Source Layer-2 ID is provided by upper layers (see messaging 415), e.g., as defined in TS 23.287. The gNB 406 uses this information to create a mapping table that contains mapping between a C-RNTI and the corresponding Source Layer-2 ID(s), as shown in the table below:

TABLE 1

| Mapping between C-RNTIs and L2 Source IDs | |
|---|---|
| C-RNTI | Source Layer-2 IDs |
| C-RNTI_1 | Source Layer-2 ID_A1 |
| | Source Layer-2 ID_B1 |
| | Source Layer-2 ID_C1 |
| C-RNTI_2 | Source Layer-2 ID_A2 |
| | Source Layer-2 ID_B2 |
| . . . | . . . |
| C-RNTI_N | Empty (not a SL UE) |

This mapping may be used by the gNB 406 to let a sidelink UE know (see message 420, 425) which of the multiple destinations belong to the same Physical UE, e.g., which sidelink UEs are clubbed. For example, the UE with C-RNTI_1 may be told that Source Layer-2 ID_A2 and Source Layer-2 ID_B2 belong to the same sidelink UE. This may allow mulitple streamlining possibilities (see block 430), as mentioned previously, on sidelink, such as:

Easier context maintenance: A single PC5 RRC and/or PC5-S connection can be established across a pair of peer UEs rather that one per source and destination L2 IDs;

RLM monitoring: A single RLM monitoring procedure across multiple Layer-2 IDs is to sufficient. This saves multiple CSI-RS transmissions, RLM reporting, RLF/ RLF procedures, and/or the like; and/or CSI reporting: Similar to the above, only one CSI reporting across the physical SL UEs may suffice.

As a further benefit, in one embodiment, the gNB 406 may:

Wake up a UE in discontinuous reception ("DRX") sleep when it expects a transmitter UE to transmit data to the said receiver. This can be based on a buffer status reporting ("BSR"), UAI or SUI. The gNB sends a wakeup signal ("WUS") to the SL receiver UE to wake it up. A WUS may convey to the UE if the wakeup is for SL or Uu purpose. This is helpful to let the UE know which DCI search space to monitor so that the UE can save power by not monitoring the other RNTIs, SS, DCI formats, CORESETs, and/or the like;

Avoid half-duplex issues by not providing a grant to a UE(A) for sidelink transmission, if it is expected, based on a sidelink grant provided to another UE(B) where the UE(B) might be transmitting resources at the same time to UE(A); and Include destination ID(s) in the sidelink grant either restricting transmission to the said destination(s) or allowing transmission to only these destinations. The UE may need to take this information into account for performing logical channel prioritization ("LCP").

In one embodiment, the foregoing solution may only be applicable to RRC Connected UEs that are connected to the same serving cell. One way to resolve this is to coordinate on Xn on the Source Layer-2 IDs received across multiple cells (e.g., of the same or different gNBs).

Figure 5:
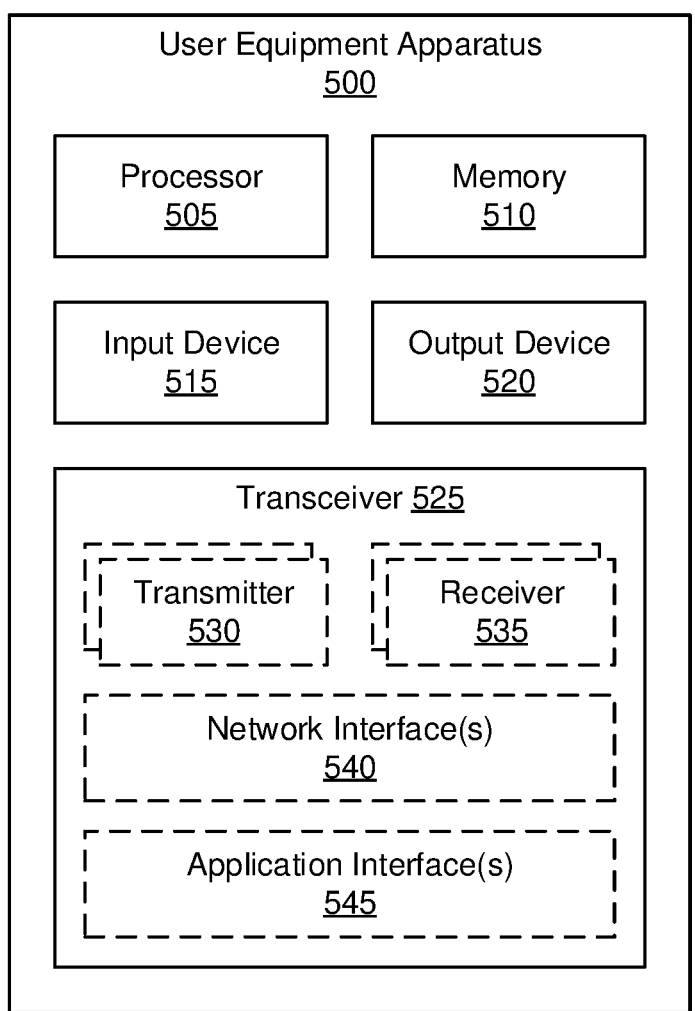
FIG. 5 is a block diagram illustrating one embodiment of a user equipment apparatus that may be used for acquiring on-demand system information.

FIG. 5 depicts a user equipment apparatus 500 that may be used for acquiring on-demand system information, according to embodiments of the disclosure. In various embodiments, the user equipment apparatus 500 is used to implement one or more of the solutions described above. The user equipment apparatus 500 may be one embodiment of the relay unit 105, the remote unit 109, and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. In some embodiments, the transceiver 525 communicates with one or more cells (or wireless coverage areas) supported by one or more base units 121. In various embodiments, the transceiver 525 is operable on unlicensed spectrum. Moreover, the transceiver 525 may include multiple UE panel supporting one or more beams. Additionally, the transceiver 525 may support at least one network interface 540 and/or application interface 545. The application interface(s) 545 may support one or more APIs. The network interface(s) 540 may support 3GPP reference points, such as Uu, N1, PC5, etc. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 505 may include an application processor (also known as "main processor") which manages application-domain and operating system ("OS") functions and a baseband processor (also known as "baseband radio processor") which manages radio functions.

In various embodiments, the processor 505 and the transceiver 525 controls the user equipment apparatus 500 to implement the above described UE behaviors. For example, in one embodiment, a transceiver 625 receives a system information block ("SIB") from a second UE device, the second UE device comprising a relay UE device for a mobile wireless communication network, and the processor 605 determines, based on the received SIB, at least one on-demand SIB from the mobile wireless communication network, the received SIB comprising information for the at least one on-demand SIB. The transceiver 625, in certain embodiments, sends a request for the at least one on-demand SIB to the second UE device.

In further embodiments, the transceiver 625 sends a message to identify second UE devices that are within a predetermined serving cell of the mobile wireless communication network, the predetermined serving cell comprising an in-coverage serving cell of the first UE, and the processor 605 selects the second UE device for receiving on-demand SIBs in response to the second UE device being within the predetermined serving cell.

In one embodiment, the transceiver 625 sends a system information block ("SIB") to a second UE device, the second UE device comprising a remote UE device for a mobile wireless communication network, the SIB comprising information for the at least one on-demand SIB, receives, from the remote UE device, a request for at least one on-demand SIB, sends a request for the at least one on-demand SIB to the mobile wireless communication network, receives, from the mobile wireless communication network, the at least one on-demand SIB, and sends the received at least one on-demand SIB to the remote UE device.

In one embodiment, the transceiver 625 receives a plurality of requests for on-demand SIBs from a plurality of remote UE devices. In certain embodiments, the processor 605 determines a group comprising the plurality of remote UE devices, the group associated with a group destination identifier that is used to send messages to the remote UE devices within the group.

In various embodiments, the transceiver 625 combines the plurality of requests for on-demand SIBs for the plurality of UE devices in the group into a single request and sends the single request to the mobile wireless communication network for serving each of the plurality of requests for on-demand SIBs.

In certain embodiments, the transceiver 625 receives a plurality of on-demand SIBs for the plurality of remote UE devices within the group and sends the received plurality of on-demand SIBs to the remote UE devices based on the group destination identifier.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to acquiring on-demand system information. For example, the memory 510 may store various parameters, panel/beam configurations, resource assignments, policies, and the like as described above. In certain embodiments, the memory 510 also stores program code and related data, such as an operating system or other controller algorithms operating on the user equipment apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touch-screen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver 525 (or portions thereof) at particular times in order to send and receive messages.

The transceiver 525 includes at least transmitter 530 and at least one receiver 535. One or more transmitters 530 may be used to provide UL communication signals to a base unit 121, such as the UL transmissions described herein. Similarly, one or more receivers 535 may be used to receive DL communication signals from the base unit 121, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/ circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
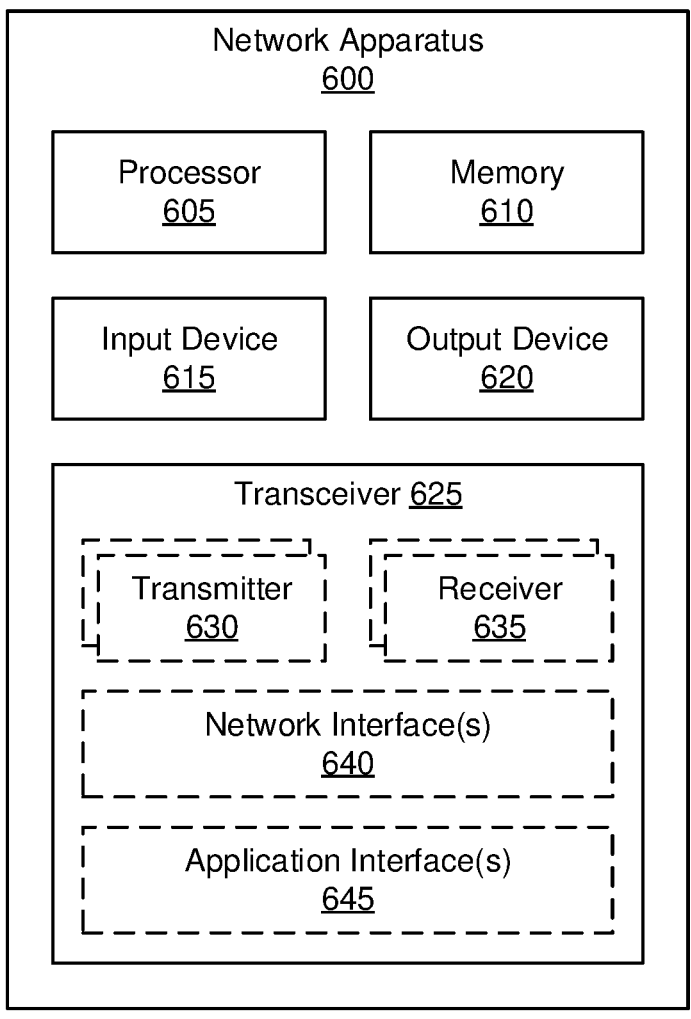
FIG. 6 is a block diagram illustrating one embodiment of a network apparatus that may be used for acquiring on-demand system information.

FIG. 6 depicts a network apparatus 600 that may be used for acquiring on-demand system information, according to embodiments of the disclosure. In one embodiment, network apparatus 600 may be one implementation of a RAN node, such as the base unit 121, the RAN node 210, or gNB, described above. Furthermore, the base network apparatus 600 may include a processor 605, a memory 610, an input device 615, an output device 620, and a transceiver 625.

In some embodiments, the input device 615 and the output device 620 are combined into a single device, such as a touchscreen. In certain embodiments, the network apparatus 600 may not include any input device 615 and/or output device 620. In various embodiments, the network apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more remote units 105. Additionally, the transceiver 625 may support at least one network interface 640 and/or application interface 645. The application interface(s) 645 may support one or more APIs. The network interface(s) 640 may support 3GPP reference points, such as Uu, N1, N2 and N3. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a CPU, a GPU, an auxiliary processing unit, a FPGA, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 600 is a RAN node (e.g., gNB) that provides on-demand SIBs. In one embodiment, the network apparatus 600 includes a transceiver (625) that receives, at a mobile wireless communication network from a first UE device, a request for an on-demand SIB for a second UE device, the first UE device comprising a relay UE device and the second UE device comprising a remote UE device, and broadcasts the on-demand SIB to the first UE device for a predetermined period of time.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to acquiring on-demand system information. For example, the memory 610 may store parameters, configurations, resource assignments, policies, and the like, as described above. In certain embodiments, the memory 610 also stores program code and related data, such as an operating system or other controller algorithms operating on the network apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the network apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. One or more transmitters 630 may be used to communicate with the UE, as described herein. Similarly, one or more receivers 635 may be used to communicate with network functions in the NPN, PLMN and/or RAN, as described herein. Although only one transmitter 630 and one receiver 635 are illustrated, the network apparatus 600 may have any suitable number of transmitters 630 and receivers 635. Further, the transmitter(s) 630 and the receiver(s) 635 may be any suitable type of transmitters and receivers.

FIG. 7 is a flowchart diagram of a method 700 for acquiring on-demand system information. The method 700 may be performed by a UE as described herein, for example, the relay unit 105, the UE 205 and/or the user equipment apparatus 500. In some embodiments, the method 700 may be performed by a processor executing program code, for example, a microcontroller, a microprocessor, a CPU, a GPU, an auxiliary processing unit, a FPGA, or the like.

The method 700, in one embodiment, includes receiving 705, at a first UE device, a system information block ("SIB") from a second UE device, determining 710, at the first UE device, based on the received SIB, at least one on-demand SIB from the mobile wireless communication network, and sending 715, from the first UE device, a request for the at least one on-demand SIB to the second UE device. The method 700 ends.

FIG. 8 is a flowchart diagram of a method 800 for acquiring on-demand system information. The method 800 may be performed by a UE as described herein, for example, the relay unit 105, the UE 205 and/or the user equipment apparatus 500. In some embodiments, the method 800 may be performed by a processor executing program code, for example, a microcontroller, a microprocessor, a CPU, a GPU, an auxiliary processing unit, a FPGA, or the like.

The method 800, in one embodiment, includes sending 805, from a first user equipment ("UE") device, a system information block ("SIB") to a second UE device, receiving 810, from the remote UE device, a request for at least one on-demand SIB, sending 815 a request for the at least one on-demand SIB to the mobile wireless communication network, receiving 820, from the mobile wireless communication network, the at least one on-demand SIB, and sending 825 the received at least one on-demand SIB to the remote UE device. The method 800 ends.

Figure 9:
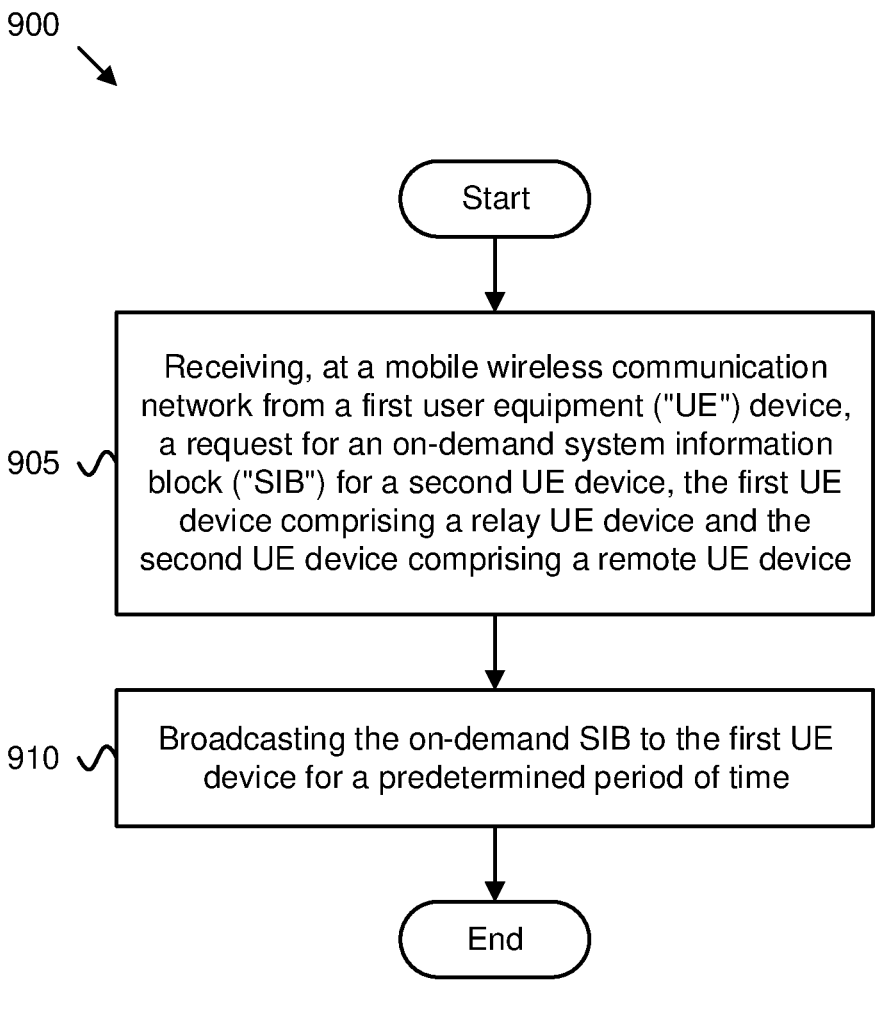
FIG. 9 is a flowchart diagram illustrating one embodiment of a method for acquiring on-demand system information.

FIG. 9 is a flowchart diagram of a method 900 for acquiring on-demand system information. The method 900 may be performed by a network device as described herein, for example, an access point 131, a cellular base unit 121, a gNB or other network apparatus 600. In some embodiments, the method 900 may be performed by a processor executing program code, for example, a microcontroller, a microprocessor, a CPU, a GPU, an auxiliary processing unit, a FPGA, or the like.

The method 900, in one embodiment, includes receiving 905, at a mobile wireless communication network from a first user equipment ("UE") device, a request for an on-demand system information block ("SIB") for a second UE device, and broadcasting 910 the on-demand SIB to the first UE device for a predetermined period of time. The method 900 ends.

A first apparatus is disclosed for acquiring on-demand system information. The first apparatus may be embodied as a UE as described herein, for example, the remote unit 109, the UE 205 and/or the user equipment apparatus 500. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver that receives a system information block ("SIB") from a second UE device, the second UE device comprising a relay UE device for a mobile wireless communication network. In certain embodiments, the first apparatus includes a processor that determines, based on the received SIB, at least one on-demand SIB from the mobile wireless communication network, the received SIB comprising information for the at least one on-demand SIB. In further embodiments, the transceiver sends a request for the at least one on-demand SIB to the second UE device.

In one embodiment, the first UE device comprises one of an out-of-coverage UE device and a UE device that is not connected to a same serving cell as the second UE device. In various embodiments, the first UE device comprises an in-coverage UE device that is configured to request the at least one on-demand SIB from the second UE device in response to a predefined condition. In one embodiment, the second UE device comprises an in-coverage UE device of the mobile wireless communication network.

In one embodiment, the transceiver sends a message to identify second UE devices that are within a predetermined serving cell of the mobile wireless communication network, the predetermined serving cell comprising an in-coverage serving cell of the first UE and the processor selects the second UE device for receiving on-demand SIBs in response to the second UE device being within the predetermined serving cell.

A first method is disclosed for acquiring on-demand system information. The first method may be performed by a UE as described herein, for example, the remote unit 109, the UE 205 and/or the user equipment apparatus 500. In some embodiments, the first method may be performed by a processor executing program code, for example, a microcontroller, a microprocessor, a CPU, a GPU, an auxiliary processing unit, a FPGA, or the like.

In one embodiment, the first method includes receiving, at a first UE device, a system information block ("SIB") from a second UE device, the second UE device comprising a relay UE device for a mobile wireless communication network. In further embodiments, the first method includes determining, at the first UE device, based on the received SIB, at least one on-demand SIB from the mobile wireless communication network, the received SIB comprising information for the at least one on-demand SIB. In certain embodiments, the first method includes sending, from the first UE device, a request for the at least one on-demand SIB to the second UE device.

In one embodiment, the first UE device comprises one of an out-of-coverage UE device and a UE device that is not connected to a same serving cell as the second UE device. In some embodiments, the first UE device comprises an in-coverage UE device that is configured to request the at least one on-demand SIB from the second UE device in response to a predefined condition. In various embodiments, the second UE device is an in-coverage UE device of the mobile wireless communication network.

In one embodiment, the first method includes sending, from the first UE device, a message to identify second UE devices that are within a predetermined serving cell of the mobile wireless communication network, the predetermined serving cell comprising an in-coverage serving cell of the first UE, and selecting, at the first UE device, the second UE device for receiving on-demand SIBs in response to the second UE device being within the predetermined serving cell.

A second apparatus is disclosed for acquiring on-demand system information. The second apparatus may be embodied as a UE as described herein, for example, the relay unit 105, the UE 205 and/or the user equipment apparatus 500. In some embodiments, the second method may be performed by a processor executing program code, for example, a microcontroller, a microprocessor, a CPU, a GPU, an auxiliary processing unit, a FPGA, or the like.

In one embodiment, the second apparatus includes a transceiver that sends a system information block ("SIB") to a second UE device, the second UE device comprising a remote UE device for a mobile wireless communication network, the SIB comprising information for the at least one on-demand SIB. In certain embodiments, the transceiver receives, from the remote UE device, a request for at least one on-demand SIB. In further embodiments, the transceiver sends a request for the at least one on-demand SIB to the mobile wireless communication network. In various embodiments, the transceiver receives, from the mobile wireless communication network, the at least one on-demand SIB. In one embodiment, the transceiver sends the received at least one on-demand SIB to the remote UE device.

In one embodiment, the transceiver receives a plurality of requests for on-demand SIBs from a plurality of remote UE devices. In certain embodiments, the second apparatus further comprises a processor that determines a group comprising the plurality of remote UE devices, the group associated with a group destination identifier that is used to send messages to the remote UE devices within the group.

In one embodiment, the group of remote UE devices is one of preconfigured and dynamically created by the first UE. In further embodiments, the transceiver combines the plurality of requests for on-demand SIBs for the plurality of UE devices in the group into a single request and sends the single request to the mobile wireless communication network for serving each of the plurality of requests for on-demand SIBs.

In one embodiment, the transceiver receives a plurality of on-demand SIBs for the plurality of remote UE devices within the group and sends the received plurality of on-demand SIBs to the remote UE devices based on the group destination identifier. In certain embodiments, the first UE device comprises an in-coverage UE device of the mobile wireless communication network.

In one embodiment, the second UE device comprises one of an out-of-coverage UE device and a UE device that is not connected to a same serving cell as the first UE device. In various embodiments, the second UE device comprises an in-coverage UE device that is configured to request the at least one on-demand SIB from the second UE device in response to a predefined condition.

A second method is disclosed for acquiring on-demand system information. The second method may be performed by a UE as described herein, for example, the relay unit 105, the UE 205 and/or the user equipment apparatus 500. In some embodiments, the second method may be performed by a processor executing program code, for example, a microcontroller, a microprocessor, a CPU, a GPU, an auxiliary processing unit, a FPGA, or the like.

In one embodiment, the second method includes sending, from a first user equipment ("UE") device, a system information block ("SIB") to a second UE device, the second UE device comprising a remote UE device for a mobile wireless communication network, the SIB comprising information for the at least one on-demand SIB. In one embodiment, the second method includes receiving, from the remote UE device, a request for at least one on-demand SIB. In various embodiments, the second method includes sending a request for the at least one on-demand SIB to the mobile wireless communication network. In various embodiments, the second method includes receiving, from the mobile wireless communication network, the at least one on-demand SIB. In certain embodiments, the second method includes sending the received at least one on-demand SIB to the remote UE device.

In one embodiment, the second method includes receiving a plurality of requests for on-demand SIBs from a plurality of remote UE devices. In some embodiments, the second method includes determining a group comprising the plurality of remote UE devices, the group associated with a group destination identifier that is used to send messages to the remote UE devices within the group. In one embodiment, the group of remote UE devices is one of preconfigured and dynamically created by the first UE.

In various embodiments, the second method includes combining the plurality of requests for on-demand SIBs for the plurality of UE devices in the group into a single request and sending the single request to the mobile wireless communication network for serving each of the plurality of requests for on-demand SIBs.

In certain embodiments, the second method includes receiving a plurality of on-demand SIBs for the plurality of remote UE devices within the group and sending the received plurality of on-demand SIBs to the remote UE devices based on the group destination identifier. In one embodiment, the first UE device comprises an in-coverage UE device of the mobile wireless communication network.

In various embodiments, the second UE device comprises one of an out-of-coverage UE device and a UE device that is not connected to a same serving cell as the first UE device. In one embodiment, the second UE device comprises an in-coverage UE device that is configured to request the at least one on-demand SIB from the second UE device in response to a predefined condition.

A third apparatus is disclosed for acquiring on-demand system information. The third apparatus may be embodied as a network device as described herein, for example, an access point 131, a cellular base unit 121, a gNB or other network apparatus 600. In some embodiments, the third apparatus may include a processor executing program code, for example, a microcontroller, a microprocessor, a CPU, a GPU, an auxiliary processing unit, a FPGA, or the like.

In one embodiment, the third apparatus includes a transceiver that receives, at a mobile wireless communication network from a first user equipment ("UE") device, a request for an on-demand system information block ("SIB") for a second UE device, the first UE device comprising a relay UE device and the second UE device comprising a remote UE device, and broadcasts the on-demand SIB to the first UE device for a predetermined period of time.

A third method is disclosed for acquiring on-demand system information. The third method may be performed by a network device as described herein, for example, an access point 131, a cellular base unit 121, a gNB or other network apparatus 600. In some embodiments, the third method may be performed by a processor executing program code, for example, a microcontroller, a microprocessor, a CPU, a GPU, an auxiliary processing unit, a FPGA, or the like.

In one embodiment, the third method includes receiving, at a mobile wireless communication network from a first user equipment ("UE") device, a request for an on-demand system information block ("SIB") for a second UE device, the first UE device comprising a relay UE device and the second UE device comprising a remote UE device, and broadcasting the on-demand SIB to the first UE device for a predetermined period of time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A first user equipment ("UE"), comprising:
   at least one memory; and
   at least one processor coupled to the at least one memory and configured to cause the first UE to:
   receive, via a sidelink interface, a system information block 1 ("SIB1") from a second UE, the second UE comprising a relay UE;
   determine, based on content of the SIB1, at least one on-demand SIB associated with operation of the first UE, wherein the received SIB1 comprises information for the at least one on-demand SIB;

determine whether the at least one on-demand SIB is required based on a condition of the first UE, the condition comprising the first UE being out-of-coverage or the first UE not being connected directly to a same serving cell as the second UE;

in response to determining the at least one on-demand SIB is required, transmit a request for the at least one on-demand SIB to the second UE via the sidelink interface; and receive, from the second UE via the sidelink interface, the at least one on-demand SIB.

2. The first UE of claim 1, wherein the first UE comprises an out-of-coverage UE or a UE that is not connected to a same serving cell as the second UE.

3. The first UE of claim 1, wherein the first UE comprises an in-coverage UE that is configured to request the at least one on-demand SIB from the second UE in response to a condition.

4. The first UE of claim 1, wherein the second UE comprises an in-coverage UE.

5. The first UE of claim 1, wherein the processor is configured to cause the first UE to:

send a message to identify that the second UE that is within a serving cell, the serving cell comprising an in-coverage serving cell of the first UE; and select the second UE for receiving on-demand SIBs in response to the second UE being within the serving cell.

6. A first user equipment ("UE"), comprising:

at least one memory; and at least one processor coupled to the at least one memory and configured to cause the first UE to:

send a system information block ("SIB") comprising SIB1 to a second UE, the second UE comprising a remote UE, the SIB comprising an indication of one or more on-demand SIBs;

receive, from the remote UE, a request for at least one on-demand SIB of the one or more on-demand SIBs, the request transmitted by the remote UE based on determining, from content of the SIB1, that the at least one on-demand SIB is associated with operation of the remote UE;

determine, at the first UE, whether to acquire the at least one on-demand SIB based on whether a condition is satisfied, the condition comprising a connectivity state of the first UE, a scheduling condition indicated in the SIB1, or a grouping criterion associated with multiple remote UEs;

send a request for the at least one on-demand SIB in response to determining that the condition is satisfied;

receive the at least one on-demand SIB in response to the request; and send the at least one on-demand SIB to the remote UE.

7. The first UE of claim 6, wherein the processor is configured to cause the first UE to receive a plurality of requests for on-demand SIBs from a plurality of remote UEs.

8. The first UE of claim 7, wherein the processor is configured to cause the first UE to determine a group comprising the plurality of remote UEs, the group associated with a group destination identifier.

9. The first UE of claim 8, wherein the group comprising the plurality of remote UEs is preconfigured or dynamically created by the first UE.

10. The first UE of claim 8, wherein the processor is configured to cause the first UE to combine the plurality of requests for on-demand SIBs for the plurality of remote UEs into a single request and send the single request for serving each of the plurality of requests for on-demand SIBs.

11. The first UE of claim 10, wherein the processor is configured to cause the first UE to receive a plurality of on-demand SIBs for the plurality of remote UEs and send the plurality of on-demand SIBs to the plurality of remote UEs based on the group destination identifier.

12. The first UE of claim 6, wherein the first UE comprises an in-coverage UE of a mobile wireless communication network.

13. The first UE of claim 6, wherein the second UE comprises an out-of-coverage UE or a UE that is not connected to a same serving cell as the first UE.

14. The first UE of claim 13, wherein the second UE comprises an in-coverage UE that is configured to request the at least one on-demand SIB from the second UE in response to a condition.

15. A method performed by a first user equipment ("UE") comprising:

sending a system information block ("SIB") comprising SIB1 to a second UE, the second UE comprising a remote UE, the SIB comprising an indication of one or more on-demand SIBs;

receiving, from the remote UE, a request for at least one on-demand SIB of the one or more on-demand SIBs, the request transmitted by the remote UE based on determining, from content of the SIB1, that the at least one on-demand SIB is associated with operation of the remote UE;

determining, at the first UE, whether to acquire the at least one on-demand SIB based on whether a condition is satisfied, the condition comprising a connectivity state of the first UE, a scheduling condition indicated in the SIB1, or a grouping criterion associated with multiple remote UEs;

sending a request for the at least one on-demand SIB in response to determining that the condition is satisfied;

receiving the at least one on-demand SIB; and sending the received at least one on-demand SIB to the remote UE.

16. The method of claim 15, further comprising receiving a plurality of requests for on-demand SIBs from a plurality of remote UEs.

17. The method of claim 16, further comprising determining a group comprising the plurality of remote UEs, the group associated with a group destination identifier.

18. The method of claim 17, wherein the group comprising the plurality of remote UEs is preconfigured or dynamically created by the first UE.

19. The method of claim 17, further comprising combining the plurality of requests for on-demand SIBs for the plurality of remote UEs into a single request and sending the single request for serving each of the plurality of requests for on-demand SIBs.

20. The method of claim 19, further comprising receiving a plurality of on-demand SIBs for the plurality of remote UEs and sending the received plurality of on-demand SIBs to the remote UEs based on the group destination identifier.

* * * * *